W. J. PUTNAM.
TIRE CHAIN AND ARMOR.
APPLICATION FILED DEC. 24, 1915.
1,187,173.
Patented June 13, 1916.
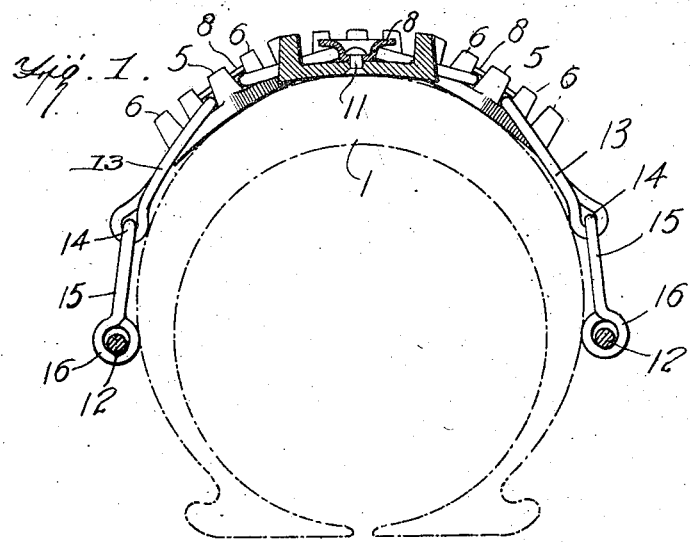
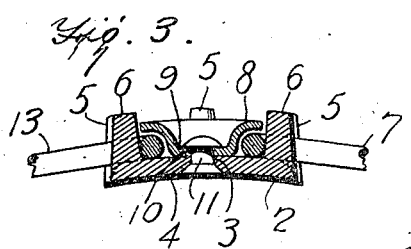
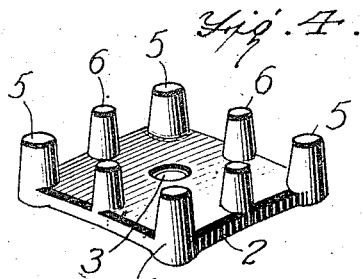
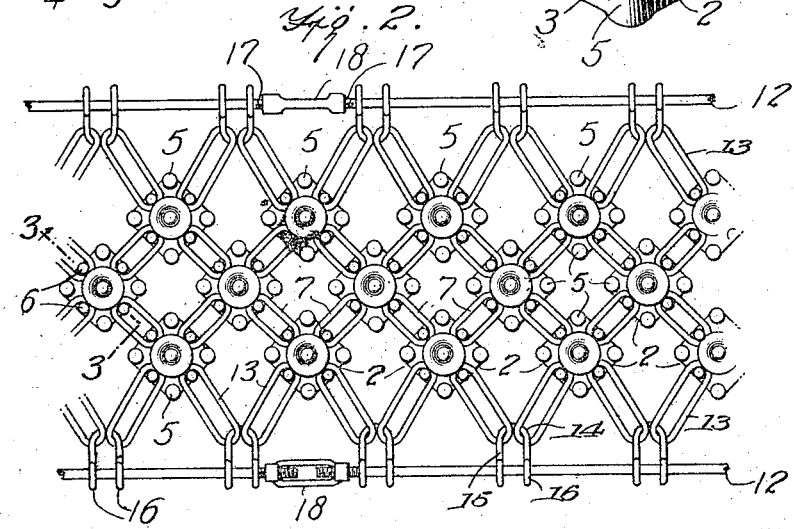
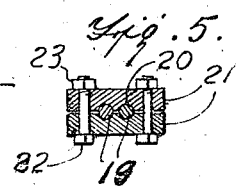
WITNESSES:
INVENTOR
WALTER J. PUTNAM,
BY Munn & Co.
ATTORNEYS

UNITED STATES PATENT OFFICE.

WALTER J. PUTNAM, OF DEPOSIT, NEW YORK.

TIRE CHAIN AND ARMOR.

1,187,173.

Specification of Letters Patent.  Patented June 13, 1916.

Application filed December 24, 1915. Serial No. 68,496.

*To all whom it may concern:*

Be it known that I, WALTER J. PUTNAM, a citizen of the United States, and a resident of Deposit, in the county of Broome and State of New York, have invented a new and useful Improvement in Tire Chains and Armor, of which the following is a specification.

My invention is an improvement in tire chains and armor, and the invention has for its object to provide a chain of the character specified, adapted for use with tires of any character for preventing skidding and slipping and for increasing the traction of the wheel, wherein a series of similar connecting or non-skid plates or blocks is provided, each having lugs or spurs on one face, and wherein connecting links are provided for connecting the plates to each other and to the holding rings, the links being adapted to engage loosely over certain of the spurs or lugs to connect the plates, and wherein a holding member or washer is connected to each of the said non-skid plates in such manner as to lap over the ends of the links engaging the spurs or lugs to prevent displacement of the links from the spurs or lugs, the members being permanently or removably connected to the non-skid plates to permit their removal to detach a plate or plates when essential, and wherein the arrangement is such that the chain, as a whole, may be elongated circumferentially of the tire by contracting the same laterally to permit the easy insertion of the chain on the tire and to afterward permit the easy tightening of the chain on the tire by the contraction of the holding means to expand the chain laterally and contract the same circumferentially of the tire.

In the drawings:—Figure 1 is a transverse section of the chain in place on a tire, Fig. 2 is a partial plan view of the chain in plane condition, Fig. 3 is a section on the line 3—3 of Fig. 2, Fig. 4 is a perspective view of one of the connecting plates or blocks, and Fig. 5 is a sectional view of a modified means for connecting the ends of the retaining members.

The present embodiment of the invention is shown in Fig. 1 in connection with a shoe or casing 1 of the clencher type, and the improved chain comprises a series of similar connecting or non-skid blocks or plates 2, each block or plate being approximately square in outline and having a central opening 3, which is reamed or counterbored as indicated at 4 at one face of the block. Each of the said plates or blocks is provided on one face with a plurality of series of outwardly extending spurs or lugs, namely, a series 5 and a series 6. The members of each series are four in number and the spurs or lugs of the series 5 are arranged at the four corners of the plate or block, while the members of the series 6 are arranged between the adjacent spurs or lugs 5, at the center of the four side edges of the plate or block.

It will be noticed that the spurs or lugs 5 are of larger size than the spurs or lugs 6, and are rounded as shown, being substantially frusto-conical in form, having their large ends or bases integral with the block or plate.

The spurs or lugs of the series 5 are holding spurs and lugs having no other function, while the spurs or lugs 6 in addition to being holding spurs or lugs are also connecting spurs or lugs, serving thus a double function.

The plates or blocks 2 are arranged as shown in the present instance in three series, extending circumferentially of the tire or longitudinally of the chain when expanded, namely, a central and two lateral series. The members of the plates or blocks of the central series are staggered with respect to the members of the plates or blocks of the lateral series, and the members of the lateral series are in alinement transversely of the chain, and the diagonals of all of the blocks transverse to the chain are parallel.

The blocks or plates of the central and lateral series are connected by links 7, each of the said links 7 engaging over lugs 6 at the adjacent side edges of adjacent plates, and the long axes of the links 7 are in alinement with the central axes of the plates. Each of the central blocks or plates is connected to four blocks or plates of the two lateral series, namely, to two blocks of each lateral series.

Each member of the lateral series is connected to two blocks of the central series, as shown, and the links are prevented from becoming disengaged from the spurs or lugs 6 by means of holding or retaining members or washers. Each of the said retaining members is in the present instance a circular washer, although it is obvious that the washers might be of the same shape as the plates or blocks or any other shape that might be advisable.

Each of the retaining members consists of two portions, a rim portion 8 and a central portion 9, which are off-set outwardly from each other and integrally connected as shown. In effect each washer is a concavo-convex washer arranged with its concave face outwardly and each washer has a central opening 10, which is adapted to register with the opening 3—4 of the plate or block 2.

A rivet 11 is passed through the registering openings, the head of the rivet engaging the counter-sunk or reamed portion 4 of the opening 3, and each rivet is headed as shown on the portion 9 of the washer. The rim portion 8 of each washer laps loosely over the inner ends of the links 7, far enough to prevent outward movement of the link but loosely enough to permit some play of the link on the lug 6.

The washers are of a size to fit loosely within or between the four lugs of the series 6, as shown in Figs. 2 and 3, and the head of the rivet is in the concavity of the washer or retaining member, and below the level of the rim portion 8 of the washer. This rim portion is also below the level of the small ends of the lugs 5 and 6, and the said lugs are in approximately the same plane.

The plates or blocks 2 of the lateral series are connected to retaining rings 12 of wire or the like, by means of links 13, and U-shaped or yoke-shaped members 14—15—16, to be later described more particularly. Each of the retaining rings 12 is a wire of suitable gage having its ends threaded as shown at 17, and the threaded ends of each wire are engaged by a turn-buckle 18, consisting of two nuts integrally connected as shown, the nuts being oppositely threaded as are also the ends 17 of the ring.

The arrangement is such that when the turn-buckles are turned in one direction the ends of the ring will be drawn together, while when the turn-buckles are turned in the other direction the ends will be moved away from each other. The links 13 are slightly longer than the links 7 but of the same gage or approximately so, and each link 13 is connected with the lug 6 of one of the lateral series of plates, engaging loosely over the lug in the same manner as the links 7 engaging over the said lugs. Each plate or block 2 has two links 13, connected therewith, and the links 13 of adjacent blocks are engaged with the body portion 14 of the adjacent members 14—15—16. Each of the said members consists of the body portion 14 and arms 15, extending approximately parallel with respect to each other, and each arm is provided at its free end with an eye 16, for engaging the adjacent ring 12. The links 13 of each plate of the lateral series diverge from each other and the links 13 of adjacent plates converge as shown. Each of the links 13 is given a quarter turn at its outer end and the bodies 14 of the members are passed through the turned ends before the retaining rings 12 are engaged with the eyes 16.

In use, the device is arranged as shown in Fig. 1, the chain, as a whole, that is, that portion of the chain between the remote corners of the plates of the lateral series being of an aggregate width sufficient to extend well over the tread of the shoe or casing. The links 13 and the members 14—15—16 are of such length that they will permit the retaining members to take the approximate position shown in Fig. 1 when the chain is in place.

It will be evident that the arrangement permits the plates or blocks of the lateral series to move toward each other and toward the plates or blocks of the intermediate or central series. When they are so moved toward each other it will be obvious that the chain, as a whole, will be elongated longitudinally of the chain or circumferentially of the tire to permit the easy placing of the chain on the tire.

When the chain is in place and the retaining rings are tightened the blocks or plates of the lateral series are moved away from each other, thus shortening and widening the chain, as a whole. If desirable, for any reason, the plates or blocks 2 may be curved transversely in one direction as shown in Fig. 3 or in both directions if thought advisable or they may be plane or approximately so.

Should for any reason it be desirable to loosen or release a plate or block or a link it is only necessary to cut the rivet which connects the retaining member to the plate or block. The link in question may be then detached or the block itself. It will be evident that instead of a rivet a bolt and nut might be used for holding the plate in place. This is especially true in making temporary repairs.

Should a link become damaged, or a plate or a rivet break, the rivet may be replaced by a bolt and nut for the time being, and the injury will not put the chain out of commission. This is a feature of importance, since the repairing of the chain both temporary and permanent is greatly facilitated. All the lugs 5 and 6 are holding or non-skid lugs to prevent movement of the plates or blocks in their planes.

The chains in addition to the feature of preventing skidding constitute a tire armor to prevent wear on the tire and to prevent puncture and injury from rough roads. All of the wear on the plates or blocks is on the small ends of the lugs 5 and 6 and the plates or blocks sitting as they do close together, offer an excellent armor protection for the tire.

The resiliency of the tire is in no degree impaired when the chains are in use, since the flexible construction permits movement of the elements of the chain in any direction to follow the movement of the tire. The improved chains may be used continuously, that is, left in place on the tires as armor.

The driver by carrying a few plates, washers and links is ready at all times to repair the chain. Should a link break it may be easily replaced and should a block or plate become broken the difficulty of replacement is no greater. In addition should a link or block break there will be no danger of skidding as would be the case were a cross chain or the like, used. Should a block break the holding lugs will still hold and should a link break the same obtains. Moreover unless the four links supporting a block or plate were broken the plate would be held in position on the chain. It will be evident that all four links of a plate must be broken before it will become detached from the chain.

In Fig. 5 is shown a modified holding means for connecting the ends of the retaining rings. In this construction the ends of the ring 19 are laid alongside each other in grooves 20 in clamping blocks 21. As regards the grooves 20, each block 21 may have two grooves lying parallel for receiving the single ends, or the single groove for receiving both ends of the ring. Bolts 22 are passed through registering openings in the blocks at the opposite sides of the grooves and the bolts are engaged by nuts 23 to clamp the blocks 21 on the wire rings.

In placing the chain the ends of one ring 12 may be released to permit the tire to be placed. The ends are then engaged with the turn-buckle 18 when used or with the clamp 21, and when the ring is tightened in the latter instance the nuts 23 are tightened to clamp the blocks on the wire ends. In Fig. 2 the turn-buckles may be turned to contact the retaining rings.

It will be evident from the description that the improved chain may be easily fitted to any diameter or size of tire by removing or adding plates and links. Within reasonable limits it will not be necessary to remove links or plates, since differences may be compensated for by expanding or contracting the tire.

I claim:

1. A tire protector comprising linked members having outwardly extending wear-resisting lugs receiving the connecting links and retaining members coacting with the linked members to prevent displacement of the connecting links and protected from wear and injury by the said outwardly extending wear-resisting lugs.

2. A tire protector comprising members having outwardly extending wear-resisting lugs, links engaging the lugs and forming connecting means between them, and retaining members attached to the lug bearing members and overlapping the links to prevent their displacement from the lugs, said retaining members being protected from wear and injury by the said lugs.

3. A tire protector comprising members having outwardly extending wear-resisting lugs, links engaging the lugs and forming connecting means between them, retaining members disposed between the lugs of the several lug bearing members and having their outer edges overlapping the inner ends of the links to prevent their displacement from the lugs, and fastening means securing the retaining members in place, the lugs projecting outwardly beyond the retaining members to protect them from injury and wear.

4. A tire protector comprising members having outwardly extending wear-resisting lugs, links engaging the lugs and forming connecting means between them, and retaining members attached centrally to the several lug bearing members and having their outer edges offset and extending over the inner ends of the links to prevent their displacement from the lugs, said retaining members being protected by the lugs which project outwardly therefrom.

5. A tire protector comprising members having outwardly extending wear-resisting lugs, links engaging the lugs and forming connecting means between them, retaining members disposed upon the lug bearing members with their central portions in contact therewith and having their edge portions offset outwardly and extending over the inner ends of the connecting links to hold them in place, and means securing the retaining members centrally to the lug bearing members.

6. A tire protector comprising members having outwardly extending wear-resisting lugs, links engaging the lugs and forming connecting means between them, and circular retaining members having their central portions depressed and placed against the lug bearing members and attached thereto, and having their outer portions overhanging the inner ends of the links to prevent their displacement from the lugs.

7. A tire protector comprising members having two sets of outwardly extending lugs, the lugs of one set being disposed at a greater distance from a central point than the lugs of the other set, and links engaging the lugs nearer the center, with the lugs remote from the center coming between each two adjacent links.

8. A tire protector comprising members having two sets of outwardly extending lugs, the lugs of one set being disposed at a greater distance from a central point than the lugs of the other set, links engaging the lugs nearer the center, with the lugs remote from the center coming between each two adjacent links, and circular retaining members secured centrally to the lug bearing members with their outer edge portions overhanging the links and approximately in contact with the lugs engaged by such links.

9. A tire protector comprising approximately square members provided at their corners and midway of their edges with outwardly extending lugs, links engaging the middle lugs, and connecting the members, and retaining members secured centrally to the lug bearing members and having their outer edges extending over the inner ends of the links to hold them from displacement with the engaging lugs, said retaining members being protected from injury and wear by the lugs which project outwardly therefrom.

10. A tire protector comprising a plurality of linked members, each of such members consisting of an approximately square plate formed at its corners and along its edges midway of the corners with outwardly extending tapering lugs.

11. A tire protector comprising plates of substantially square form provided at their corners and along their edges midway of the corners with outwardly extending tapered lugs, links engaging the middle lugs and connecting the plates in series, washers having their middle portions depressed and placed upon the several plates with their depressed portions in contact therewith, the outer edge portions of the washers overlapping the links, and fastenings connecting the washers centrally with the plates, the lugs projecting beyond the washers to receive the wear and protect the washers from injury.

WALTER J. PUTNAM.